Nov. 30, 1965    R. W. ANTHONY ETAL    3,220,311
RELIEF SHAVING
Filed Jan. 11, 1965
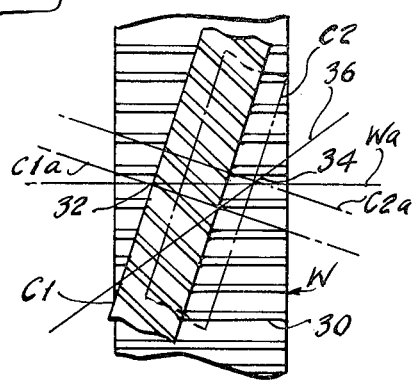
Fig. 4
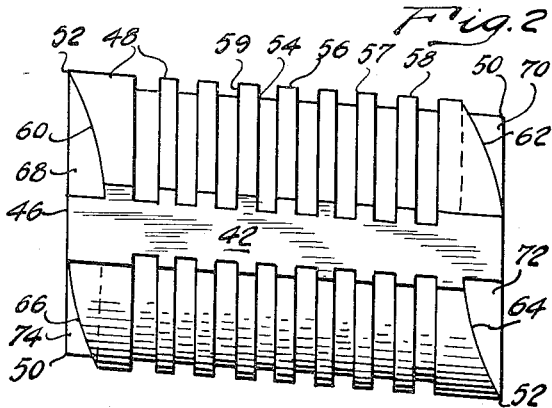
Fig. 2
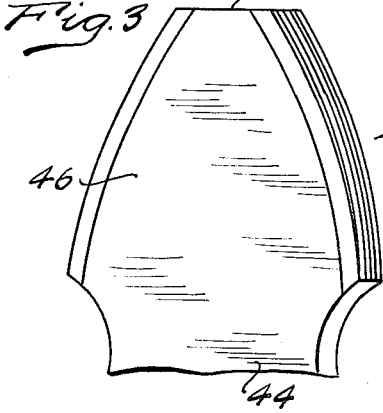
Fig. 3
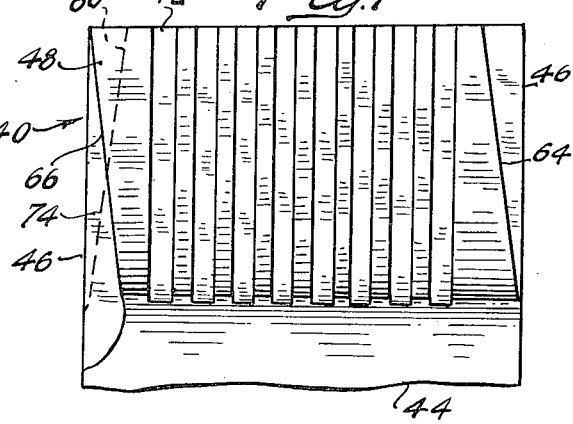
Fig. 1
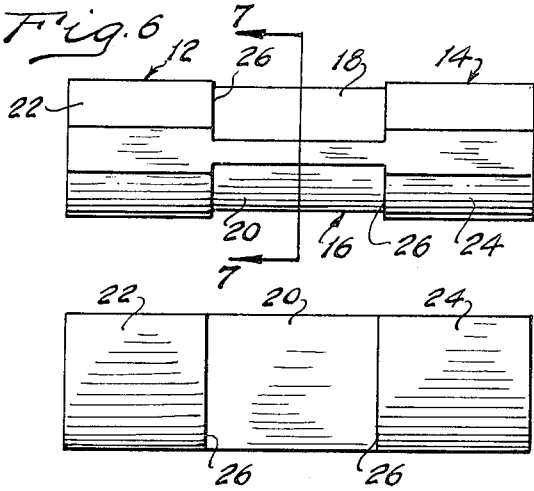
Fig. 6
Fig. 5
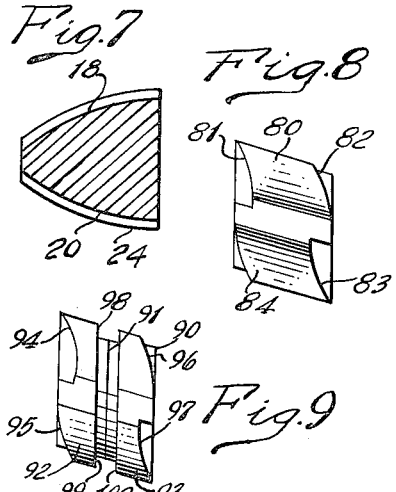
Fig. 7
Fig. 8
Fig. 9
INVENTORS.
RUSSEL W. ANTHONY
MAX B. MENTLEY
BY DAVID W. DANIEL
Whittemore, Hulbert
& Belknap
ATTORNEYS 3,220,311
RELIEF SHAVING
Russel W. Anthony and Max B. Mentley, Detroit, and David W. Daniel, Birmingham, Mich., assignors to National Broach & Machine Company, Detroit, Mich., a corporation of Michigan
Filed Jan. 11, 1965, Ser. No. 425,683
15 Claims. (Cl. 90—1.6)

This is a continuation-in-part of application Serial No. 176,189, filed February 26, 1962 now abandoned.

The present invention relates to relief shaving and more particularly to a method of relief shaving and a relief shaving cutter therefor.

It is an object of the present invention to provide a method and tool for shaving a portion or portions of the surface of each tooth of a gear so as to provide a shoulder between the shaved portion and the unshaved portion thereof.

More specifically, it is an object of the present invention to provide a method and tool for the purpose described in the preceding paragraph in which the shoulder occupies or substantially occupies a plane perpendicular to the axis of the gear.

It is a further object of the present invention to provide a method and tool as described in the preceding paragraphs in which the shoulder is characterized by substantially sharp corners at its intersection with the shaved and unshaved surfaces of the gear tooth.

More specifically, it is an object of the present invention to provide a relief shaving cutter in the form of a gear having teeth provided with cutting edges adjacent each corner thereof, said cutting edges extending generally from roof to crest, and being laterally inclined with respect to planes perpendicular to the axis of the cutter.

More specifically, it is an object of the present invention to provide a relief shaving tool as described in the preceding paragraph in which the cutting edges adjacent the corners and at the same side of each tooth are inclined in the same direction with respect to radial planes and both of the cutting edges on the opposite side of each tooth are inclined in the opposite direction with respect to planes perpendicular to the axis of the cutter.

It is a further object of the present invention to provide a relief shaving tool in the form of a helical gear having teeth, each of which is provided with cutting edges adjacent its corners, the cutting edges at the obtuse corners of each tooth being inclined toward the adjacent end of the tooth as measured in the root to crest direction, the cutting edges at the acute corners of each tooth being inclined away from the adjacent end of the tooth as measured in the root to crest direction.

It is a further object of the present invention to provide a method of relief shaving gear teeth which comprises rolling the gear in mesh with a gear-like cutter having teeth provided with oppositely inclined corner cutting edges extending generally in a root to crest direction, effecting a relative traverse between said gear and cutter in a direction which is parallel to a plane parallel to the axes of both gear and cutter and which extends at an angle in said plane with respect to both of said axes, in which the cuter is positioned relative to the gear such that the common normal to the axes of the gear and cutter coincides with a side surface of the cutter while intersecting the gear at a point spaced inwardly of both side surfaces thereof during traverse.

Other objects and features of the invention will become apparent as the description proceeds, especially when taken in conjunction with the accompanying drawing, illustrating a preferred embodiment of the invention, wherein:

FIGURE 1 is a side elevation of a single tooth of a relief shaving tool.
FIGURE 2 is a plan view of the tooth shown in FIGURE 1.
FIGURE 3 is an end view of the tooth shown in FIGURE 1.
FIGURE 4 is a schematic view illustrating the relative traverse required to carry out the present invention.
FIGURE 5 is an elevational view of a single tooth of a work gear relief shaved in accordance with the present invention.
FIGURE 6 is a plan view of the tooth shown in FIGURE 5.
FIGURE 7 is a sectional view on the line 7—7, FIGURE 6.
FIGURE 8 is a top plan view of a tooth of a modified cutter.
FIGURE 9 is a top plan view of a tooth of still a different modification of cutter.

Referring first to FIGURES 5, 6 and 7 there is illustrated a single tooth of a relief shaved gear which is used in industry with a mating internal spline gear having teeth, the mid-portion of which extends outwardly to mate with the relief shaved teeth as seen in the figures. The relief shaved tooth 10 comprises end portions 12 and 14, which are preferably of a usual tooth form such, for example, as involute, and which includes the relieved center portion 16. The center portion 16 includes flank or side tooth surfaces 18 and 20 which are preferably involute but these surfaces have been relief shaved to lie below the involute surfaces 22 and 24 respectively. The central relief shaved portion 16 of the tooth 10 terminates in abrupt shoulders 26 at opposite ends thereof and these shoulders occupy or substantially occupy planes which are perpendicular to the axis of the gear; moreover, these shoulders intersect the involute surfaces 18, 20, 22 and 24 in substantially sharp angled corners. Where the relief shaved tooth is a tooth of a spur gear, as illustrated herein, it will be appreciated that the sharp corners referred to include angles of ninety degrees.

It will be understood that the gear having teeth of the form shown in FIGURE 6 is adapted to mesh with a gear having teeth the end portions of which, rather than the central portion, are relieved. Thus in a matching set, the unrelieved end portions of the teeth of one gear engage in mesh with the relieved end portions of the teeth of the other gear whereas the relieved central portion of the teeth of the said one gear engages in mesh with the unrelieved central portion of the teeth of the said other gear. As a result of this relationship, the teeth inter-engage or interlock so as to prevent undesired or accidental relative slippage out of mesh in an axial direction.

Prior to the present invention the provision of relieved teeth of the type referred to herein has been accomplished by the use of special machines requiring a very considerable investment. In accordance with the present invention, the gear teeth may be relief shaved as disclosed herein by employing a method requiring the use of a special tool, the method however being capable of performance on standard gear shaving machines. Thus, instead of buying a special machine for the job, the manufacturer can produce relief shaved gears on standard available gear shaving equipment merely by using special relatively inexpensive tools in a very particular manner.

The relief shaving tool or cutter is in the form of a gear having teeth which are adapted to mesh with the teeth of a work gear while the axes of the gear or relief shaving cutter are crossed in space. Thus, where the work gear is in the form of a spur gear, the cutter will be in the form of a helical gear adapted to mesh with the work gear only when the teeth of the work gear and gear-like cutter are crossed in space at an angle dependent on the difference between the helix angles of the gear and cutter, or in this particular case, at an angle dependent on the helix angle of the cutter.

In FIGURES 1 through 3 there is illustrated a single tooth of a cutter which is shown enlarged relative to the teeth of the work gear to clarify the disclosure. The relief shaving tool is normally formed of high-speed steel and is provided with a multiplicity of cutting edges which are adapted to remove shavings or chips from the surface portions of the teeth of the work gear. This shaving action is largely due to the crossed axes relationship between the gear and cutter.

Involute gears operate in mesh with their teeth in sliding contact, and if the axes of a pair of involute gears are parallel, this sliding contact is a maximum adjacent the roots and crests of the teeth and diminishes to zero at the pitch line. However, when a pair of involute tooth members such as a pair of gears or a work gear and tool are operated in mesh with their axes crossed, then there is a relative slippage even at the pitch line due to the fact that the surface portions of the teeth are moving in divergent planes.

Moreover, when an involute gear and a tool or cutter in the form of an involute gear are in mesh with their axes crossed, contact between surface portions of the teeth of the gear and tool is in theory limited to narrow zones at and adjacent the points on the toothed surfaces of the gear and tool intersected by the single line which is perpendicular simultaneously to the axes of both the gear and tool or cutter. This line is referred to herein as the common normal.

From the foregoing it will be apparent that if a gear and gear-like cutter are rotated in mesh without relative traverse, only an annular zone of relatively narrow axial extent will be machined on the surfaces of the gear teeth. In order to distribute the finishing action of the cutter over a substantial axial extent of the teeth of the work gear, and ordinarily from end to end thereof, it has in the past been the practice to provide a relative traverse, either in the direction of the axis of the gear or in a direction which is transverse to the axes of both the gear and the tool. This latter relative traverse is referred to as diagonal traverse and has the advantage of employing different portions of the tooth surfaces of the cutter, thereby extending tool life.

Referring now to FIGURE 4, there is shown a portion of a work gear W having teeth (herein shown as spur) indicated diagrammatically at 30 in which it is desired to relief shave the central portion of the teeth as illustrated in FIGURES 5–7. The position of its axis is indicated at $Wa$. The relief shaving is accomplished by using a tool or cutter, two positions of which are shown at C1 and C2. The position of the cutter designated C1 is shown in full lines and its position C2 is shown in broken lines. The cutter is of less width than the gear W. The axis of the cutter when the cutter is in the position C1 is designated as $C1a$ and its axis when the cutter is in the broken line position designated C2 is shown at $C2a$. The position of the single line which is perpendicular to and intersecting axis $Wa$ and the axis $C1a$ when the cutter is in its full line position C1 is designated 32. The position of the single line which is perpendicular to and intersecting axis $Wa$ and to the axis $C2a$ when the cutter is in its broken line position C2 is designated 34. It will be apparent from an inspection of FIGURE 4 that the cutter moves from the position C1 to the position C2 by a relative traverse with respect to the gear W in the direction of the arrow 36. The position of the so-called common normals whose locations are indicated at 32 and 34 for two different positions of the cutter determines the width of the annular zone which is machined on the toothed surface of the gear W. If the direction of relative traverse indicated by arrow 36 is made to extend at a smaller angle with respect to the axis $Wa$, everything else being the same, the width of the relieved zone on each tooth will be increased. Conversely, to decrease the width of the relieved zone, the direction of relative traverse should be changed to increase its angularity with respect to the axis $Wa$.

In order to produce shoulders 26 so that they extend substantially in radial planes and so that they make sharp intersections with the involute surfaces of both the relieved and unrelieved tooth portions, requires the use of a very specially modified relief shaving cutter, a tooth of which is illustrated in FIGURES 1 through 3. This tooth, indicated generally at 40, has conventional portions which will be clearly specified to avoid possible confusion. The top or crest of the tooth is designated 42. The bottom or root portion of the tooth is designated 44. The end surfaces of the tooth are designated 46. The side or flank surfaces of the tooth are designated 48. Since the cutter is illustrated as in the form of a helical gear, the corners of each tooth are either obtuse or acute, or as best seen in FIGURE 2, the obtuse corners of the tooth are designated 50 and the acute corners designated 52.

In order that the teeth of the cutter shall remove chips or shavings from the teeth of the gear, the teeth are provided with a multiplicity of cutting edges. Intermediate the ends of each tooth of the cutter, these cutting edges are provided with shallow grooves or serrations 54 leaving intermediate each adjacent pair of serrations an upstanding rib 56. The corners of each rib as indicated at 57 and 58 are sharp cutting edges which, as shown in FIGURE 2, are defined by the intersection of the side walls 59 of each serration 54 and the unserrated side or flank surface portion 48 of the tooth. These intermediate serrations 54 are provided in the plane of roll of the tool, or in other words in planes perpendicular to the axis thereof. If the side walls 59 of each serration 54 are also perpendicular to the axis of the tool, then the cutting edges 57 and 58 are respectively acute and obtuse. If preferred, by known methods, the acute angle cutting corner 57 may be modified to include 90 degrees or more if desired. The operation of these cutting edges is identical with the operation of similarly serrated gear shaving cutters with which the art is thoroughly familiar. The teeth of the relief shaving cutter are especially modified to provide corner cutting edges 60, 62, 64 and 66. These cutting edges are formed by relieving the side or flank surfaces of the teeth throughout the areas designated at 68, 70, 72 and 74 respectively. The cutting edges 60, 62, 64 and 66 are carefully designed to be inclined with respect to planes perpendicular to the tool axis in a particular way and at particular angles so as to produce the desired result.

Specifically, it will be observed that the cutting edge 66 is formed by the provision of a relieved surface 74 in which the width of the relieved area 74 decreases as it extends from the root 44 toward the crest 42 of the tooth. It will further be observed that this cutting edge 66 which is located at an obtuse corner 50 of the tooth is inclined towards the adjacent end 46 of the tooth as it extends from root to crest thereof.

It will be observed that the cutting edge 64 which is provided at the acute corner 52 of the tooth at the same side as the obtuse corner 50 thereof is formed by a relief area 72 whose width increases as it extends from root to crest of the tooth. With this arrangement it will be observed that the cutting edge 64 is inclined away from the adjacent end 46 of the tooth as measured in the root to crest direction.

It will be observed from the foregoing that the cutting edges 66 and 64 are thus substantially parallel to each other.

It will further be observed, particularly from FIGURE 2, that the cutting edge 62 which is at an obtuse corner 50 is formed similarly to the cutting edge 66 disposed at the diagonally opposite obtuse corner in the inclination thereof and extends toward the adjacent end of the tooth as measured in the root to crest direction. Similarly, the cutting edge 60 is formed symmetrically with respect to the cutting edge 64 at the diametrically opposite corner of the tooth therefrom and extends away from the adjacent end of the tooth as measured in the root to crest direction.

In FIGURE 1 the position of the cutting edge 60 is indicated in dotted lines and it will be observed that the cutting edge is inclined oppositely with reference to a plane perpendicular to the axis of the tool (such as, for example, the plane occupied by a side surface 46 of the tool) from the inclination of the cutting edge 66. On the other hand, as viewed from above (FIGURE 2), the cutting edges 60 and 66 appear to extend in substantial parallelism.

Accordingly, it may be said that the corner cutting edges at one side of each tooth are inclined to extend in substantial parallelism whereas both of the cutting edges of the opposite side of the same tooth are oppositely inclined with reference to planes perpendicular to the tool axis.

It will of course be appreciated that if the cutter having teeth 40 is properly positioned with reference to a work gear W, only one end portion of the cutter teeth may be employed to finish an end portion of the teeth of the work gear. Thus, instead of relieving a central portion of the gear teeth, an end portion thereof will be relieved.

For a more complete understanding of the invention, the results of an actual test including dimensions of parts will be set forth. A 12–24 pitch, 30° pressure angle cutter having 113 teeth and a 4° right hand helix with a face width of one inch was employed. The inclination of the cutting edges 60, 62, 64 and 66 was in the direction shown in FIGURE 2 but the angularity of these inclined cutting edges was approximately 8° with respect to planes perpendicular to the tool axis.

It will be observed that the angle of inclination of each of the cutting edges located at the corners of the teeth of the tool is twice the crossed axes relationship between the gear and cutter. This of course is because the gear is a spur gear and the cutter has a 4° helix angle. It has been found that in order to provide the shoulders 26 on the work gear so as to extend in planes perpendicular to the axis of the gear, this approximate angular relationship of the corner cutting edges is necessary.

The cutter was operated with a gear with which it was desired to produce a relief having a width of 2 1/16".

Since it was necessary to have the center of crossed axes or the common normal between the gear and cutter at the opposite faces of the cutter upon completion of the shaving, it was calculated that the diagonal angle should be 3°47'. It will of course be appreciated that to produce a narrower relief, or if using a wider cutter, the diagonal angle would have been substantially increased.

The operation was performed with a cutter speed of 130 r.p.m. and table travel was set at 1.32" per minute. The crossed axes angle was of course 4 since the work gear was a spur gear and the cutter was a 4° right hand helix gear. The operation was performed with six cutting strokes followed by four idle strokes during which the knee was raised .013" to remove .018" over pins. The cycle time was approximately 7½ minutes. The amount of material removed, as indicated above, corresponds to a relief shaved zone having a normal depth of approximately .005".

The shoulders corresponding to the shoulders 26, as seen in FIGURES 5 and 6, extended substantially in radial planes with no perceptible fillet at the corners. Moreover, the involute of the relieved surfaces was very good.

While the cutting stroke is necessarily sufficient to bring the gear and cutter into relationship in which the common normal is at one side or at both sides of the cutter, additional diagonal traverse is possible without producing interference or without producing fillets at the top or bottom of the shoulders 26. The additional diagonal traverse in the direction of the arrow 36, simply introduce clearance between the teeth of the gear and the teeth of the cutter.

A somewhat modified cutter may be produced which eliminates the serrations or grooves 54 intermediate the ends of the teeth. In FIGURE 8 a single tooth of such a cutter is indicated at 80 and has cutting edges 81, 82, 83 and 84 at opposite corners thereof, all of which correspond exactly to the cutting edges 60, 62, 64 and 66 in the tooth illustrated in FIGURE 2.

A somewhat modified cutter may be produced in two halves adapted to be brought into endwise abutment and fastened together. A single tooth of such a cutter is illustrated at 90 in FIGURE 9, the line 91 designating the line of juncture between the two halves of the cutter. Again, ends of the tooth portions 92 and 93 respectively are provided with inclined cutting edges 94, 95, 96 and 97 which correspond respectively to cutting edges 60, 66, 62 and 64 of FIGURE 1. In addition, the adjacent ends of the tooth portions 92 and 93 are modified to provide a single serration, groove or gash indicated at 98, which permits the tool to be sunk more readily into the work piece and which provides oppositely facing cutting edges 99 and 100. The two halves of the cutter may be separated for resharpening if desired.

While the direction of inclination of the cutting edges 60, 62, 64 and 66 has been indicated in FIGURE 2, it will be appreciated that the amount of this inclination, and in some cases the exact shape of the cutting edge, may be varied as required to produce the desired surfaces on the teeth of a work gear. In FIGURE 1 for example, the cutting edges 66 and 64 are shown as straight in the projection of this figure. In a particular case if these straight inclined cutting edges do not produce exactly the required form of end surfaces of the relief areas on the teeth of the work gear, they may be modified as required, either concave or convex as viewed in FIGURE 1, or as may sometimes be required having a double concave or convex curvature above and below the pitch line.

The drawing and the foregoing specification constitute a description of the improved method and tool for relief shaving in such full, clear, concise and exact terms as to enable any person skilled in the art to practice the invention, the scope of which is indicated by the appended claims.

What we claim as our invention is:

1. A relief shaving cutter for use in relieving teeth of gears, said cutter being in the form of a gear having teeth provided with grooves extending generally up and down the sides of the teeth and forming intermediate cutting edges occupying the side surfaces of said teeth, the end portions of each side of each tooth being relieved to provide end cutting edges which extend continuously from the crest to the root and which occupy the side surfaces of said teeth, the end cutting edges at the same side of all of said teeth being inclined in the same direction with respect to planes perpendicular to the axis of said cutter, and the end cutting edges at the opposite side of all of said teeth being inclined in the opposite direction with respect to planes perpendicular to the axis of said cutter.

2. A cutter as defined in claim 1 in which the cutter is in the form of a helical gear intended for relief shaving of a spur gear and in which the angle of inclination of each of the cutting edges at the corners of the teeth of the cutter from planes perpendicular to the axis of the cutter are approximately equal to twice the helix angle of the cutter.

3. A relief shaving cutter for use in relieving teeth of gears, said cutter being in the form of a gear having helical teeth provided with grooves extending generally up and down the sides of the teeth and forming intermediate cutting edges occupying the side surfaces of said teeth, each tooth of said cutter having diagonally related obtuse and acute end corners, the end portions of the side surfaces at the end of each tooth at the obtuse corners thereof being relieved to form cutting edges which extend continuously from crest to root thereof and to provide relief surfaces of decreasing axial extent as measured from root to crown of said tooth, the side surfaces at the end of each tooth at the acute corners thereof being relieved to provide relief surfaces which are of increasing axial extent as measured from root to crown thereof.

4. A cutter as defined in claim 3 in which the cutter is in the form of a helical gear intended for relief shaving of a spur gear and in which the angle of inclination of each of the cutting edges at the corners of the teeth of the cutter from planes perpendicular to the axis of the cutter are approximately equal to twice the helix angle of the cutter.

5. A relief shaving cutter for use in relieving teeth of gears, said cutter being in the form of a helical gear having teeth having obtuse and acute included angle corners and provided with grooves extending generally up and down the sides of the teeth and forming intermediate cutting edges occupying the side surfaces of said teeth, the end portions of each side of each tooth being relieved to provide end cutting edges which occupy the side surfaces of said teeth and which extend continuously from the crests to the roots thereof, the end cutting edges at the obtuse included angle corners being inclined toward the adjacent end of the tooth in the root-to-crest direction, and the cutting edges at the acute included angle corners are inclined away from the adjacent end of the teeth in the root-to-crest direction.

6. A cutter as defined in claim 5 in which the cutter is in the form of a helical gear intended for relief shaving of a spur gear and in which the angle of inclination of each of the cutting edges at the corners of the teeth of the cutter from planes perpendicular to the axis of the cutter are approximately equal to twice the helix angle of the cutter.

7. A gear shaving cutter in the form of a helical gear having teeth having obtuse and acute included angle corners and provided with a single continuous cutting edge on each corner extending from root to crest thereof but inclined with respect to planes perpendicular to the axis of said cutter, the cutting edges at the obtuse included angle corners of each tooth being inclined toward the adjacent end of the tooth in the root-to-crest direction, and the cutting edges at the acute included angle corners of each tooth being inclined away from the adjacent end of the tooth in the root-to-crest direction.

8. A relief shaving cutter for use in relieving the teeth of spur gears intermediate their ends, said cutter being in the form of a helical gear having its ends relieved to provide end cutting edges at the corners thereof, each cutting edge extending continuously from the crest to the root of the tooth and formed by the intersection of the side and end surfaces of said teeth, the end cutting edges at the same side of said teeth being inclined at a small angle in the same direction with respect to planes perpendicular to the axis of said cutter and the end cutting edges at the opposite sides of said teeth being inclined at the same angle in the opposite direction with respect to planes perpendicular to the axis of said cutter.

9. A relief shaving cutter for use in relieving the teeth of spur gears intermediate their ends, said cutter being in the form of a helical gear having its ends relieved to provide end cutting edges at the corners thereof, each cutting edge extending continuously from the crest to the root of the tooth and formed by the intersection of the side and end surfaces of said teeth, the end cutting edges at the same side of said teeth being inclined at a small angle in the same direction with respect to planes perpendicular to the axis of said cutter and the end cutting edges at the opposite sides of said teeth being inclined at the same angle in the opposite direction with respect to planes perpendicular to the axis of said cutter, the angle of inclination of the cutting edge at each corner of the teeth being approximately equal to twice the helix angle of the cutter.

10. A relief shaving cutter for use in relieving the intermediate portions of the teeth of spur gears, said cutter being in the form of a helical gear having obtuse and acute included angle corners, the ends of said teeth being relieved to provide end cutting edges at the corners thereof defined by the intersections between the relieved ends and the sides of said teeth, said end cutting edges extending continuously from the roots to the crests of said teeth, the end cutting edges at the obtuse included angle corners being inclined toward the adjacent end of the tooth in the root-to-crest direction, and the cutting edges at the acute included angle corners are inclined away from the adjacent end of the teeth in the root-to-crest direction.

11. The method of relief shaving a gear which comprises rolling it in mesh with a gear-like cutter having teeth provided with oppositely inclined corner cutting edges extending generally in a root-to-crest direction, effecting a relative traverse between said gear and cutter in a direction which is parallel to a plane parallel to the axes of both gear and cutter and which extends at an angle in said plane with respect to both of said axes, in which the cutter is positioned relative to the gear such that the common normal to the axes of the gear and cutter coincides with a side surface of the cutter while intersecting the gear at a point spaced inwardly from both side surfaces thereof during traverse.

12. The method of relief shaving a gear which comprises rolling it in mesh with a gear-like cutter having teeth provided with oppositely inclined corner cutting edges extending generally in a root-to-crest direction, effecting a relative back and forth traverse between said gear and cutter in a direction which is parallel to a plane parallel to the axes of both gear and cutter and which extends at an angle in said plane with respect to both of said axes, in which the cutter is positioned relative to the gear such that the common normal to the axes of the gear and cutter coincides with a side surface of the cutter while intersecting the gear at a point spaced inwardly from both side surfaces thereof during traverse.

13. The method of relief shaving a gear which comprises rolling it in mesh with a gear-like cutter having teeth provided with oppositely inclined corner cutting edges extending generally in a root-to-crest direction, effecting a relative traverse between said gear and cutter in a direction which is parallel to a plane parallel to the axes of both gear and cutter and which extends at an angle in said plane with respect to both of said axes, in which the cutter is positioned relative to the gear such that the common normal to the axes of the gear and cutter coincides with both side surfaces of the cutter while intersecting the gear at points spaced inwardly from the sides thereof.

14. The method of relief shaving a gear which comprises rolling it in mesh with a gear-like cutter having teeth of a helix angle different from that of the teeth of the gear, the teeth of the cutter having laterally inclined corner cutting edges, the corner cutting edges at one side of all of the teeth of said cutter being inclined in the same direction relative to a plane perpendicular to the axis of the cutter and the corner cutting edges at the opposite sides of said teeth being inclined in the opposite direction relative to the plane perpendicular to the axis of the cutter, effecting a relative traverse between said gear and cutter which is parallel to a plane parallel to the axes of both gear and cutter and which extends at an angle in said plane with respect to both of said axes, in which the cutter is positioned relative to the gear such that the common normal to the axes of the gear and cutter coincides with a side surface of the cutter while intersecting the gear at a point spaced inwardly from both side surfaces thereof during traverse.

15. The method of relief shaving a gear which comprises rolling it in mesh with a gear-like cutter having teeth of a helix angle different from that of the teeth of the gear, the teeth of the cutter having laterally inclined corner cutting edges, the corner cutting edges at one side of all of the teeth of said cutter being inclined in the same direction relative to a plane perpendicular to the axis of the cutter and the corner cutting edges at the opposite sides of said teeth being inclined in the opposite direction relative to the plane perpendicular to the axis of the cutter, effecting a relative traverse between said gear and cutter which is parallel to a plane parallel to the axes of both gear and cutter and which extends at an angle in said plane with respect to both of said axes, in which the cutter is positioned relative to the gear such that the common normal to the axes of the gear and cutter coincides with both side surfaces of the cutter while intersecting the gear at points spaced inwardly from both side surfaces thereof during traverse.

References Cited by the Examiner
UNITED STATES PATENTS

| | | | |
|---|---|---|---|
| 2,669,905 | 2/1954 | Miller | 90—1.6 |
| 2,780,146 | 2/1957 | Saari | 90—1.6 |
| 2,882,798 | 4/1959 | Bregi et al. | 90—1.6 |

FOREIGN PATENTS 665,947  2/1952  Great Britain.

WILLIAM W. DYER, JR., *Primary Examiner.*